United States Patent
Biers, Sr.

(10) Patent No.: US 10,426,081 B2
(45) Date of Patent: Oct. 1, 2019

(54) ATTACHABLE STORAGE DEVICE FOR A LANDSCAPE MACHINE

(71) Applicant: John E. Biers, Sr., Feura Bush, NY (US)

(72) Inventor: John E. Biers, Sr., Feura Bush, NY (US)

( * ) Notice: Subject to any disclaimer, the term of this patent is extended or adjusted under 35 U.S.C. 154(b) by 54 days.

(21) Appl. No.: 14/640,884

(22) Filed: Mar. 6, 2015

(65) Prior Publication Data
US 2015/0250096 A1    Sep. 10, 2015

Related U.S. Application Data

(60) Provisional application No. 61/949,300, filed on Mar. 7, 2014.

(51) Int. Cl.
*A01D 34/00*        (2006.01)
*B60R 9/06*         (2006.01)
*B60R 21/13*        (2006.01)

(52) U.S. Cl.
CPC ............ *A01D 34/001* (2013.01); *B60R 9/06* (2013.01); *B60R 21/13* (2013.01)

(58) Field of Classification Search
CPC ..... A01D 34/001; A01D 75/00; A01D 75/008
USPC ....... 224/401, 282, 518–520, 495, 502, 506, 224/509, 511, 410, 274, 522, 526, 527; 248/282.1, 240, 240.04, 289; 211/107, 211/110
See application file for complete search history.

(56) References Cited

U.S. PATENT DOCUMENTS

| | | | |
|---|---|---|---|
| 4,995,537 A * | 2/1991 | Thedieck | B60R 7/14 211/64 |
| 5,421,457 A | 6/1995 | Listenberger | |
| 5,439,151 A * | 8/1995 | Clayton | B60R 9/065 224/282 |
| 5,544,799 A * | 8/1996 | Didlake | B60R 9/06 224/282 |
| 5,771,582 A | 6/1998 | Tuggle | |
| 6,237,823 B1 * | 5/2001 | Stewart | B60R 9/065 224/282 |
| 6,425,510 B1 * | 7/2002 | King | B60R 9/065 224/401 |
| 6,494,427 B1 | 12/2002 | Smith | |
| 6,502,728 B2 * | 1/2003 | Savant | B60R 9/06 224/401 |
| 7,188,865 B2 * | 3/2007 | Sugiyama | E02F 9/0833 280/759 |
| D551,862 S | 10/2007 | Gerry | |

(Continued)

*Primary Examiner* — Peter N Helvey
(74) *Attorney, Agent, or Firm* — Schmeiser, Olsen & Watts, LLP

(57) ABSTRACT

Disclosed herein is a landscaping machine including a protective rollover bar having a left bar portion extending from a left side of an operator seat, a top bar portion extending from the left bar portion above the operator seat, and a right bar portion extending from the top bar portion to a right side of the operator seat. The landscaping machine further includes a storage device attached to the protective rollover bar, the storage device extending between and attached to the left bar portion and the right bar portion. The storage device includes a receptacle that is configured to hold objects during operation of the landscaping machine. Further disclosed herein is a storage device attachable to a landscape machine and a storage device kit.

24 Claims, 8 Drawing Sheets

(56) References Cited

U.S. PATENT DOCUMENTS

| | | | |
|---|---|---|---|
| 7,908,953 B2 | 3/2011 | Yarborough et al. | |
| 8,215,049 B2* | 7/2012 | Schuchman | F41A 23/34 42/94 |
| 8,561,960 B2* | 10/2013 | Sinclair | B62D 33/0621 135/88.08 |
| 8,757,044 B2* | 6/2014 | Hagedorn | F41A 27/30 89/37.03 |
| 2003/0052218 A1 | 3/2003 | Knizner | |
| 2005/0103816 A1* | 5/2005 | Flannery | B60R 9/06 224/509 |
| 2005/0155275 A1 | 7/2005 | Keksi | |
| 2007/0262108 A1* | 11/2007 | Columbia | B60R 9/06 224/519 |
| 2012/0180281 A1* | 7/2012 | Miller | B60R 7/14 29/401.1 |
| 2013/0193710 A1* | 8/2013 | Kimura | E02F 9/166 296/65.06 |
| 2014/0144961 A1* | 5/2014 | Hill | B60R 9/00 224/401 |

* cited by examiner

US 10,426,081 B2

ATTACHABLE STORAGE DEVICE FOR A LANDSCAPE MACHINE

RELATED MATTERS

This application claims priority to provisional patent application No. 61/949,300, filed Mar. 7, 2015, and entitled "LANDSCAPE MACHINE ATTACHABLE CRATE DEVICE," the disclosure of which is hereby incorporated by reference to the extent that it is not inconsistent with the present disclosure.

FIELD OF TECHNOLOGY

The subject matter disclosed herein relates generally to wheeled machines such as lawn mowers, ATV's, tractors, dump trucks, fork lifts, front end loaders, asphalt rollers, landscape machines, industrial machines and construction machines. More particularly, the subject matter relates to a wheeled machine having an attachable storage device.

BACKGROUND

Presently, there is no space provided on small equipment such as Z-turn mowers, subcompact tractors, hydraulic excavators, and the like, to carry an operator's lunch, beverage, small tools, and debris from lawns and work areas. Operators often carry everything on the platform where they mount or dismount from the machine. This makes it very dangerous because their feet get tangled up, increasing the likelihood of operators falling from the machine and becoming injured on the job. An example of a daily routine for a lawn mowing job, for example, includes a laborer walking through the property to pick up the trash and debris. Once this is completed, the lawn mower operator can mow the property. As the lawn mower operator is mowing the property, the laborer can then follow the power operator to clean off sidewalks and parking lots left from mowers with a gas powered blower, and to trim overhanging branches and the like. The ability to carry tools (such as a gas powered blower, handsaw, trimmer, and other support tools) on the tractor would increase productivity of the operation, and may even reduce the need for the laborer who follows the tractor operator around.

Thus, an attachable storage device for a landscape machine would be well received in the art.

BRIEF DESCRIPTION

According to one embodiment, a landscaping machine comprises: a protective rollover bar having a left bar portion extending from a left side of an operator seat, a top bar portion extending from the left bar portion above the operator seat, and a right bar portion extending from the top bar portion to a right side of the operator seat; a storage device attached to the protective rollover bar, the storage device extending between and attached to the left bar portion and the right bar portion; and wherein the storage device includes a receptacle that is configured to hold objects during operation of the landscaping machine.

According to another embodiment, a storage device comprises: a first clamp attachable to a left bar portion of a protective rollover bar of a landscape machine; a second clamp attachable to a right bar portion of the protective rollover bar of the landscape machine; a support bar extending between the first clamp and the second clamp; and a receptacle attached to the support bar, the receptacle extending at least substantially between the first clamp and the second clamp.

According to another embodiment, a storage device kit comprises: a first clamp attachable to a left bar portion of a protective rollover bar of a landscape machine; a second clamp attachable to a right bar portion of the protective rollover bar of the landscape machine; a support bar extendable and attachable between the first clamp and the second clamp; and a receptacle attachable to the support bar such that the receptacle is extendable at least substantially between the first clamp and the second clamp.

DETAILED DESCRIPTION

Figure 1:
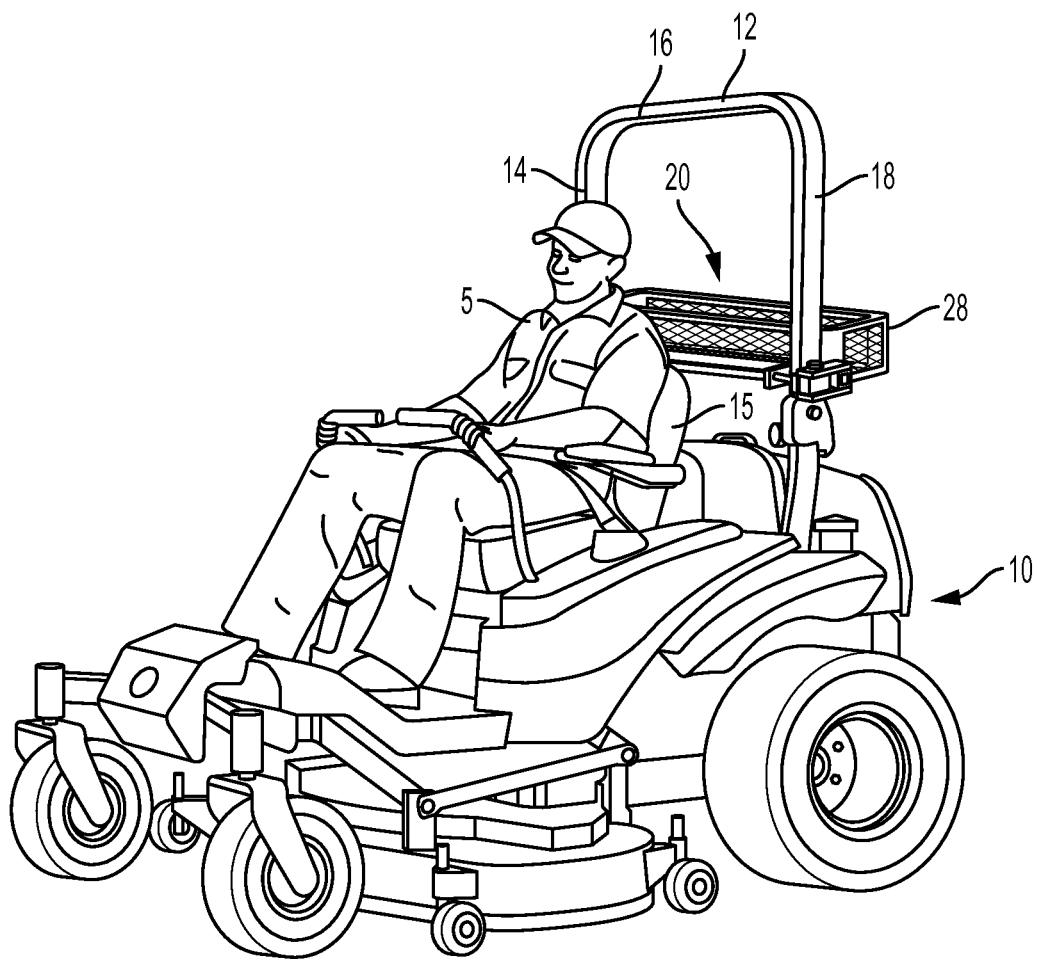
FIG. 1 depicts a perspective view of a landscape machine having an attached storage receptacle according to one embodiment.

A description of the hereinafter described embodiments of the disclosed apparatus and method are presented herein by way of exemplification and not limitation with reference to the photographs.

Referring to the photograph FIGS. 1-5, a landscape machine 10 is shown being operated by an operator 5. The landscape machine 10 includes a protective rollover bar 12. The protective rollover bar extends from a left bar portion 14 extending from a left side of an operator seat 15, to a top bar portion 16 extending from the left bar portion 14 above the operator seat 15, to a right bar portion 18 extending from the top bar portion 16 to a right side of the operator seat 15. Attached to the protective rollover bar 12 is a storage device 20. The storage device 20 includes a left clamp 22 and a right clamp 24. A support bar 26 extends between the left clamp 22 and the right clamp 24. The support bar 26 may further be attached to each of the left clamp 22 and the right clamp 24. The storage device 20 further includes a receptacle 28 that is configured to hold objects during operation of the landscaping machine. The storage device 20 may be attached directly behind the operator seat 15 in one embodiment.

The receptacle 28 may be attached to the support bar 26. It should be understood that the receptacle may be a basket, crate, container, bin, box, repository or the like. The receptacle may be any storage device configured to receive landscaping hand tools, garbage, and the like. Furthermore, the receptacle 28 may be an open basket having a flat bottom surface, as shown in the Figures. In other embodiments, the receptacle 28 may be a fully enclosed container or crate having an inner storage cavity with an closeable opening that provides access to the inner storage cavity.

Figure 2:
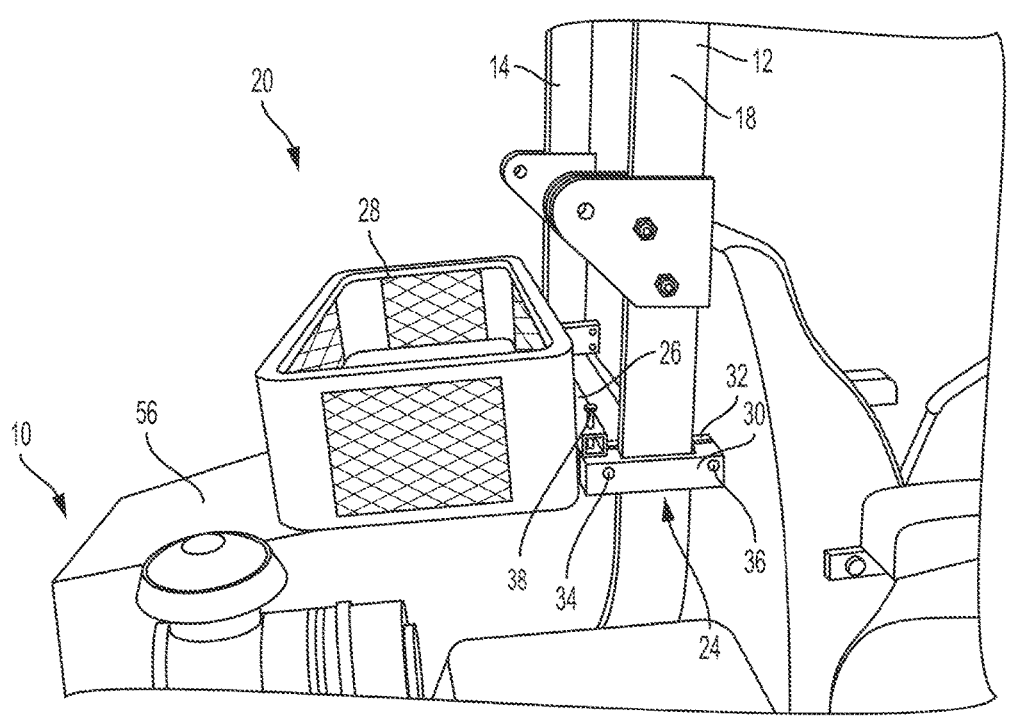
FIG. 2 depicts a right side perspective view of the storage device attached to the landscape machine of FIG. 1 according to one embodiment.

Referring now specifically to FIG. 2, the right clamp 24 is shown more closely. The right clamp 24 is shown surrounding the right bar portion 18 of the protective rollover bar 12. The right clamp 24 includes a first bar 30 and a second bar 32. The right clamp 24 may further include a first bolt 34 and a second bolt 36. The first bar 30 and the second bar 32 may be clamped together with the tightening of two bolts 34, 36 with respective nuts (not shown). Thus, the right clamp 24 may be configured for any thickness rollover bar. The thicker or wider the rollover bar 12, the less the nuts would be required to be tightened onto the bolts 34, 36.

The right clamp 24 further includes a pin 38 extending vertically through the support bar 26 and the first bar 30. The support bar 26 and the first bar 30 may each include corresponding vertically oriented openings configured to receive the pin 38. In the embodiment shown, the first bar 30 is C-shaped with two extending portions configured to wrap tightly around the right bar portion 18. The extending portion may provide structure for the vertically oriented opening through which the pin 38 extends. The second bar 32 may be a flat bar without extending portions. In other embodiments, the right clamp 24 may include other structural components.

Figure 3:
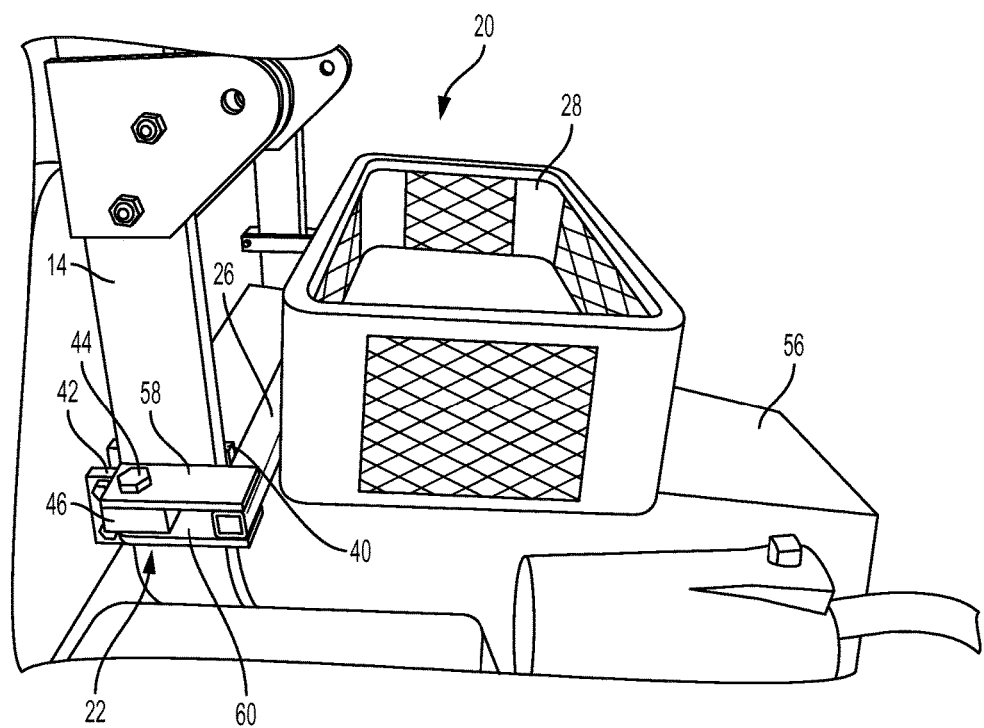
FIG. 3 depicts a left side perspective view of the storage device attached to the landscape machine of FIGS. 1-2 according to one embodiment.
Figure 4:
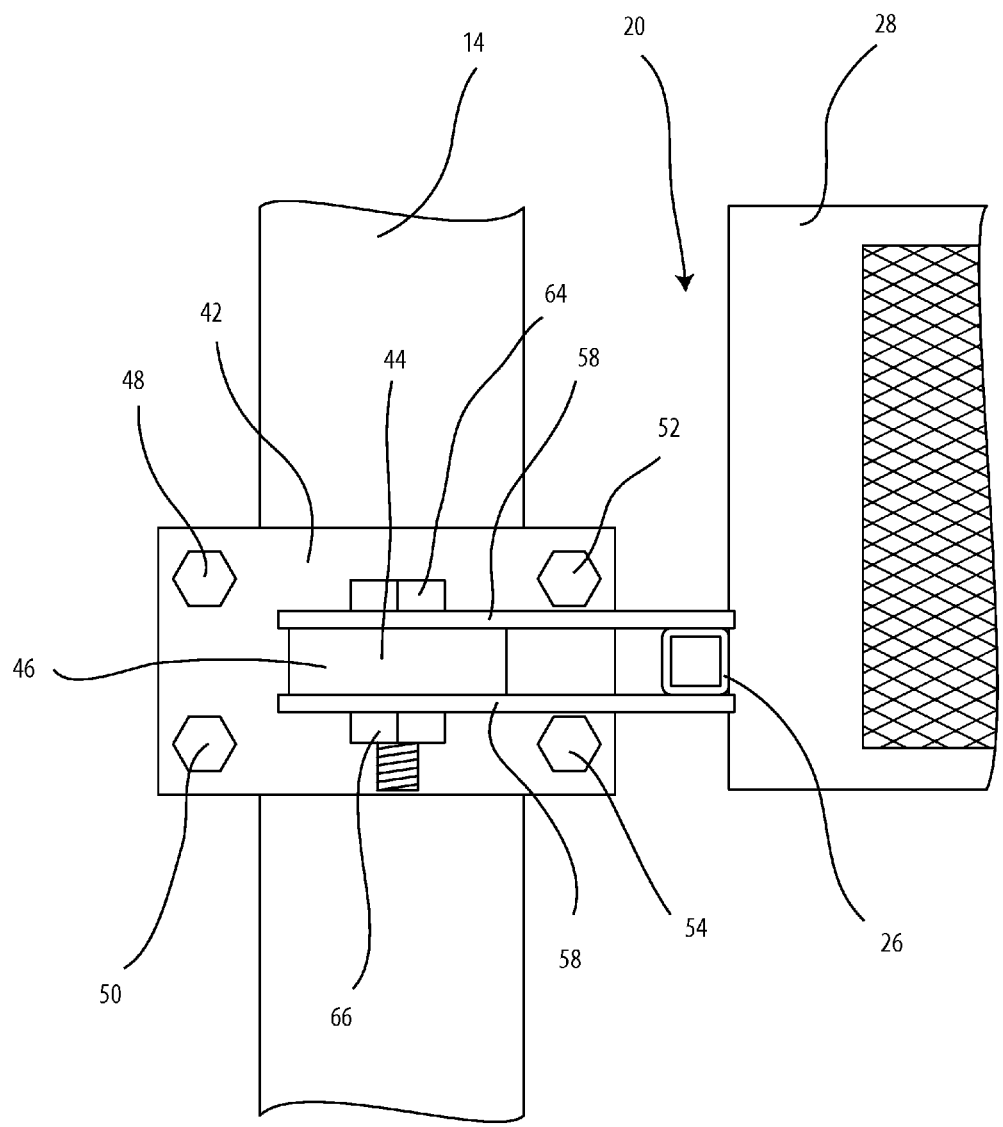
FIG. 4 depicts an enlarged perspective view of a left clamp of the storage device of FIGS. 1-3 according to one embodiment.
Figure 5:
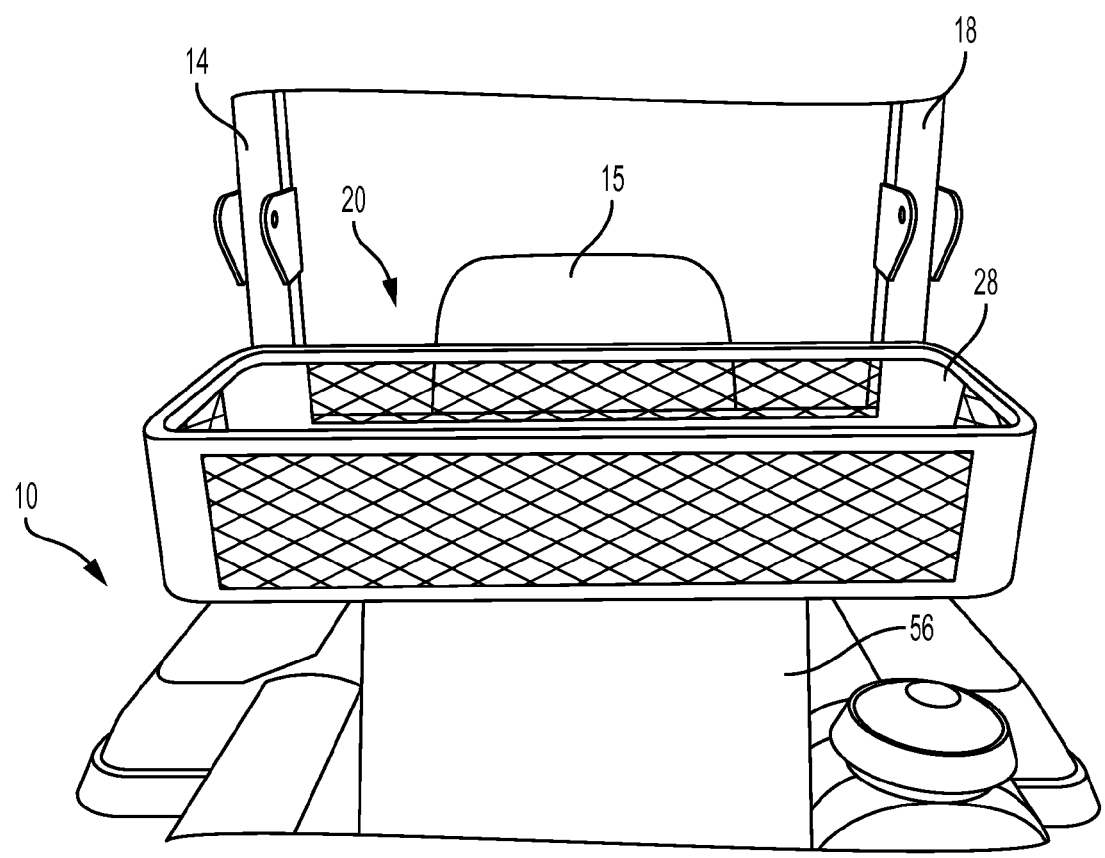
FIG. 5 depicts a back perspective view of the storage device attached to the landscape machine of FIGS. 1-3 according to one embodiment.

Similarly, as shown in FIGS. 3 and 4, the left clamp 22 may include a first bar 40 and a second bar 42 which are clamped together with the tightening of a first bolt 48, a second bolt 50, a third bolt 52, and a fourth bolt 54. In the embodiment shown, the left clamp 22 may include additional bolts than the right clamp 24. Further, the first and second bars 40, 42 of the left clamp 22 may be thicker than the first and second bars 30, 32 of the right clamp 24. In other embodiments, the first and second bars 40, 42 of the left clamp 22 may have the same thickness of the first and second bars 30, 32 of the right clamp 24. Further, the left clamp 22 may include only two bolts or may include more than four bolts as shown. Likewise, the right clamp 24 may include four or more bolts in other embodiments. Furthermore, the bolts 34, 36, 48, 50, 52, 54 are shown extending in the same direction as the support bar 26 while the bars 30, 32, 40, 42 may extend perpendicularly in the embodiment shown. However, in other embodiments, either or both of the bolts 34, 36 of the right clamp 24 or the bolts 50, 52, 54 of the left clamp 22 could extend perpendicularly with respect to the support bar 26, while the bars 30, 32, 40, 42 may extend parallel. In other words, in some embodiments, the clamps 22, 24 may be installed rotated 90 degrees about the left and right bar portions 14, 18 relative to the embodiment shown.

It should be understood that the left and right clamps 22, 24 clamps may be configured to provide structural support so create an attachment location for the support bar 26. Other types of clamps that could also perform this function are contemplated. For example, spring-based clamps are contemplated which may have a high spring constant such that the clamps do not loosen or move when the operator 5 is operating the landscape machine 10. In other embodiments, no clamps may be necessary and the support bar 26 may be welded or otherwise permanently integrated in between the left bar portion 14 and the right bar portion 18. In still other embodiments, no support bar 26 may be necessary and the receptacle 28 may be integrally attached between the left bar portion 14 and the right bar portion 18. The receptacle 28 may be attached between the left and right bar portions 14, 18 of the protective rollover bar 12 in any manner.

Figure 6:
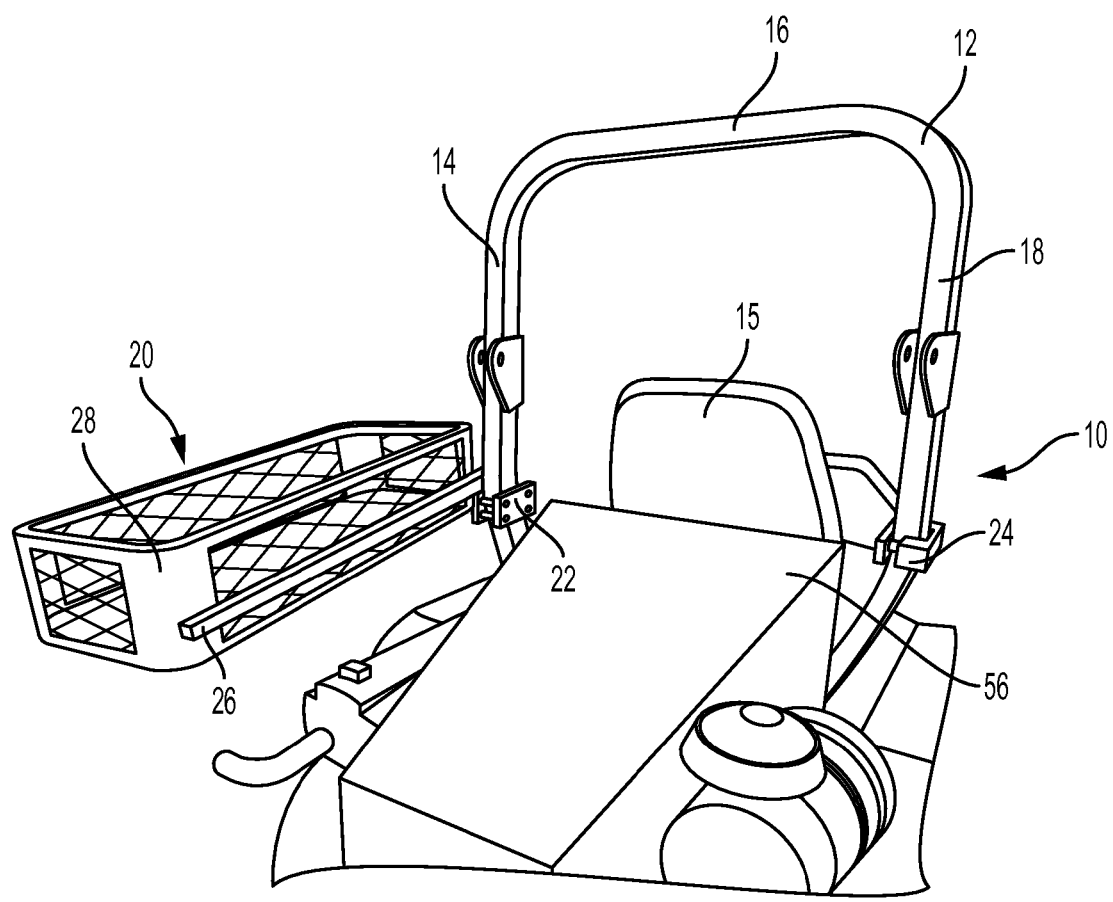
FIG. 6 depicts a back perspective view of the storage device of FIGS. 1-3 and 5, in an open state according to one embodiment.

Referring still to FIGS. 3 and 4, the second bar 42 of the left clamp 22 may include a second bar projection 46 extending perpendicularly from an outside face of the second bar 42. The second bar projection 46 may extend in a parallel direction with respect to the support bar 26 when the support bar 26 is pinned to the right clamp 24. The second bar projection 46 may include a bore or opening (not shown) which extends vertically through the second bar projection 46. The bore or opening may be configured to receive a bolt 64. The bolt 64 may be configured to create a hinge 44 between a top extending bar 58 extending from the support bar 26, a bottom extending bar 60 extending from the support bar 26, and the second bar projection 46 extending from the second bar 42 of the left clamp 22. The bolt 64 may be secured with a nut 66 located under the bottom extending bar 60. Thus, the bolt 64 may provide a hinge for allowing rotation of the support bar 26 about the left clamp 22. This rotation is shown in FIG. 6, where the receptacle 28 has been rotated about the left clamp 22 and the left bar portion 14 of the protective rollover bar 12. It should be understood that, in other embodiments, the receptacle 28 may be configured to rotate about the right clamp 24 and the right bar portion 18 of the protective rollover bar 12. In this embodiment, the structural features shown on the left clamp 22 in the Figures may be applied to the right clamp and the structural features shown on the right clamp 24 in the Figures may be applied to the left clamp.

The top extending bar 58 and the bottom extending bar 60 may be permanently attached to the support bar 26 such that they extend horizontally from a left end of the support bar 26. The top extending bar 58 and the bottom extending bar 60 may be integrally forged as an extension of the support bar 26. In other embodiments, the top extending bar 58 and the bottom extending bar 60 may be attached by bolts to the support bar 26. Whatever the attachment mechanism, the top and bottom extending bars 60 may extend from the support bar 26 such that they are located above and below the second bar projection 46 and allowed to hingedly rotate with respect to the second bar projection 46 via the hinge 44.

It should further be understood that other mechanisms are contemplated for providing rotation about one of the clamps. For example, in one embodiment, the right clamp 24 may include a cylindrical outer housing oriented vertically and attached to one of the first bar 48 and the second bar 50. This cylindrical outer housing may be configured to receive a downward extending projection extending from the bottom of the support bar 26. This may create a rotating hinge.

The clamps 22, 24 the support bar 26, the pin 38, the receptacle 28 and the bolts 34, 36, 48, 50, 52, 54 may each be sold in a kit together for attachment to a landscaping machine's rollover bar 12. It should be understood that together, these items may be referred to as an attachable storage device 20. In one embodiment, the support bar 26 may be telescopic and may include, for example, an inner elongated bar and an outer elongated bar (not shown) which may be slidably increased or decreased in length and then pinned or otherwise retained at a particular length. This telescopic feature may provide for attachment of the attachable storage device 20 to various dimensions of rollover bars 12. For example, one tractor or landscape machine 10 may have a wider or narrower rollover bar 12 than another. The telescopic feature of the support bar 26 may accommodate for these various sizes, and allow the same kit to be installed on any number of landscape machines 10. In addition to a kit, the storage device 20 may be permanently installed on the landscape machine 10 in the factory during the assembly of the landscape machine.

The rotation of the storage device 20 about the left bar portion 14 and hinge joint 44 may be configured to provide more accessibility of the receptacle 28. Furthermore, the rotation of the storage device 20 may provide for access to a motor compartment 56 when the landscape machine 10 needs to be serviced. Thus, in one embodiment, the storage device 20 may be located directly above this motor compartment 56 and may prevent the removability of a hood panel when the storage device 20 is in place.

It should be understood that one embodiment of the storage device 20 is shown, but many are contemplated. For example, the storage device 20 may be rotatable about either the left or right bar portion 14, 18. In one embodiment, the left and right clamps 22, 24 may be attachable to either bar portion 14, 18. In another embodiment, the storage device 50 may not be rotatable at all, and may simply be removable by removing pins, such as the pin 38 in each side (i.e. an embodiment having two clamps having the structural features of the right clamp 24) when engine service is necessary. In still another embodiment, the support bar 26 may be attached directly to and extend between the left and right bar portions 14, 18 and so the storage device 20 may not actually require additional clamps 22, 24. Furthermore, the size and volume of the receptacle 28 may differ depending on the embodiment.

The storage device 20 is shown located at a low section of the rollover bar 12. In other embodiments, the storage device 20 may be attachable to an upper portion of the rollover bar 12. In still other embodiments, more than one storage device 20 may be attachable to a rollover bar in instances where more storage capacity is required. Components of the storage device 20 may be made of metal or plastic or the like. For example, in the embodiment shown, the receptacle 28 may be made of plastic while the structural components of the clamps 22, 24 and the support bar 26 may be made of metal.

Figure 7:
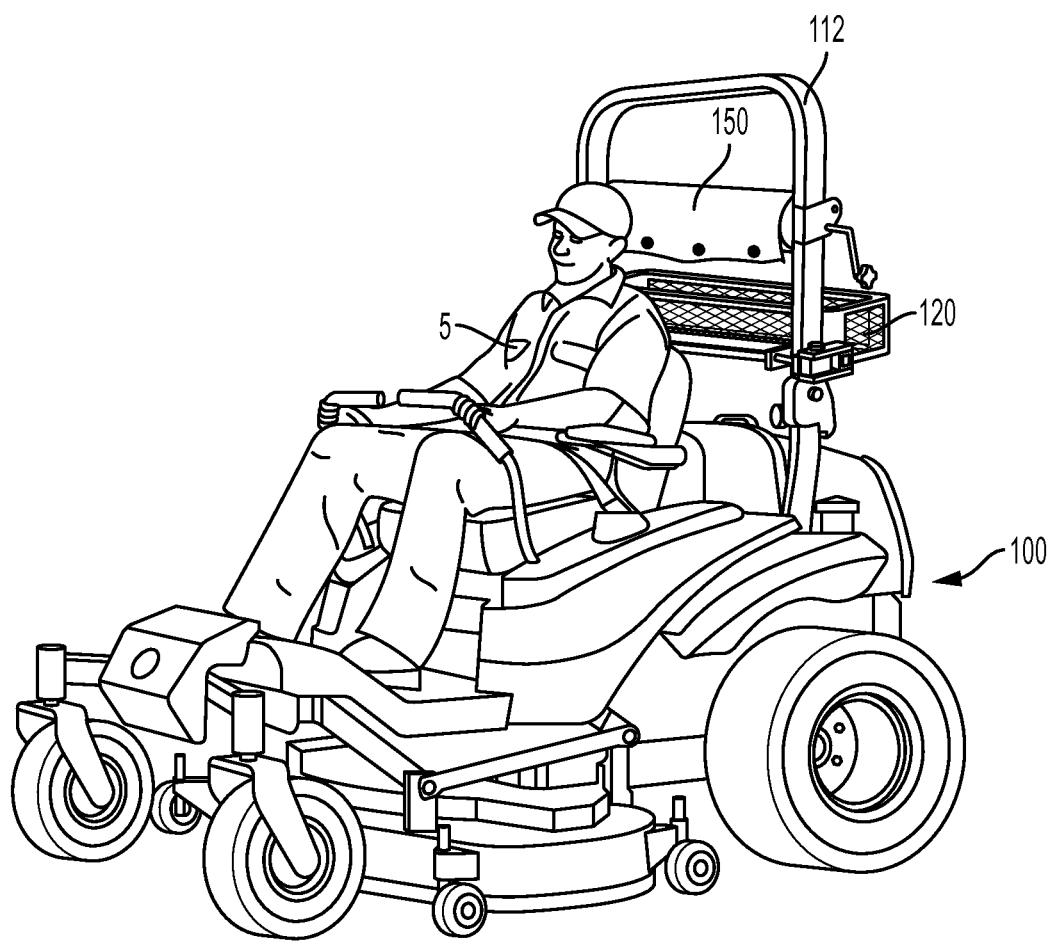
FIG. 7 depicts another landscape machine having both an attached storage device and an attached covering system according to one embodiment.

Referring now to FIG. 7, another embodiment of a landscape machine is shown. The landscape machine 100 includes a storage device 120. The storage device 120 may be similar to the storage device 20 described hereinabove, and may include some or all of the various features and configurations described. In addition to the storage device 120, the landscape machine 100 may include a covering system 150. The covering system 150 may include an elongated rotatable member affixed to a protective rollover bar 112, the elongated rotatable member extending between and attached to the left bar portion and the right bar portion. The covering system 150 may further be attached to the elongated rotatable member configured to be rolled and unrolled with rotation of the elongated rotatable member. The covering system 150 may include a front covering portion and a rear covering portion. The front covering portion may be configured to cover a front of the landscaping machine 100 in an unrolled state. The rear covering portion may configured to cover a rear of the landscaping machine 100 in the unrolled state. The covering system 150 is described in greater detail in U.S. Pat. No. 8,777,263, which is hereby incorporated by reference to the extent that it is not inconsistent with the present disclosure. The covering system 150 may be attached at a location that is above the storage device 120 on the protective rollover bar 112, as shown. In other embodiments, the covering system 150 may be attached at a location that is below the storage device 120 on the protective rollover bar 112.

Figure 8:
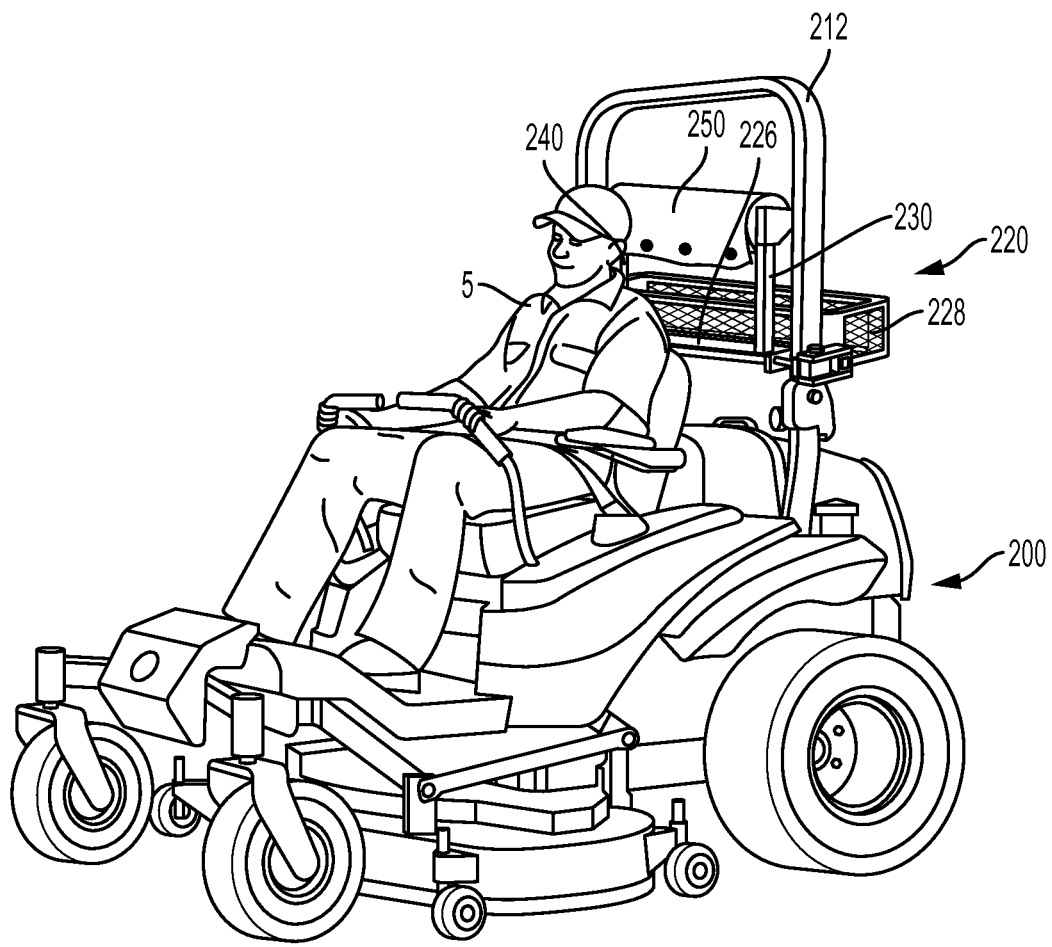
FIG. 8 depicts another landscape machine having an attached storage device with a covering system attached to the storage device according to one embodiment.

Still another embodiment is shown in FIG. 8 of another landscape machine 200. The landscape machine 200 includes a storage device 220 that may be similar to the storage devices 20, 120 described hereinabove, and may include some or all of the various features and configurations described. In addition to those features, the storage device 220 is shown having a first vertical support 230 and a second vertical support 240 attached to and extending vertically from a horizontal support bar 226, similar or the same as the horizontal support bar 26 described hereinabove. The first and second vertical supports 230, 240 may be configured to provide structure from which to extend a covering system 250 therebetween. The covering system 250 may be similar to the covering system 150 described hereinabove and in U.S. Pat. No. 8,777,263, and may include some or all of the various features and configurations described. However, rather than being attached to and extending between the sides of a protective rollover bar 212, the covering system 250 is attached to and extends between the vertical supports 230, 240. In other embodiments, the vertical supports 230, 240 may be attached directly to a receptacle 228 of the storage device 220 at a similar or the same horizontal location, and extend vertically therefrom. It should be understood that a kit may be sold that includes both the storage device 20, 120, 220, and the covering system 150, 250 either attachable in this manner, or the manner described hereinabove in FIG. 7.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

I claim:

1. A landscaping machine comprising:
   a protective rollover bar having a left bar portion extending from a left side of an operator seat, a top bar portion extending from the left bar portion above the operator seat, and a right bar portion extending from the top bar portion to a right side of the operator seat;
   a storage device attached to the protective rollover bar, wherein the storage device comprises a support bar extending between and attached to the left bar portion and the right bar portion; and
   wherein the storage device includes a receptacle that is configured to hold loose objects during operation of the landscaping machine, wherein the receptacle comprises an inner storage cavity, and wherein the support bar is configured to rotate about at least one of the left bar portion and the right bar portion while remaining attached to the protective rollover bar such that an axis of rotation of the storage device is at least substantially parallel to at least one of the left bar portion and the right bar portion.

2. The landscaping machine of claim 1, wherein the storage device further includes a first clamp attached to the left bar portion and a second clamp attached to the right bar portion.

3. The landscaping machine of claim 1, wherein the storage device is attached behind the operator seat.

4. The landscaping machine of claim 1, wherein the storage device further includes a support bar extending between the first clamp and the second clamp and attached to each of the first clamp and the second clamp.

5. The landscaping machine of claim 1, further comprising a covering system attached to at least one of the storage device and the protective rollover bar, the covering system including:
 an elongated rotatable member;
 a cover attached to the elongated rotatable member configured to be rolled and unrolled with rotation of the elongated rotatable member;
 wherein the cover includes a front covering portion and a rear covering portion, wherein the front covering portion is configured to cover a front of the landscaping machine in an unrolled state, and wherein the rear covering portion is configured to cover a rear of the landscaping machine in the unrolled state.

6. The landscaping machine of claim 1, further comprising a removable pin insertable into at least one of the first clamp and the second clamp, wherein removal of the removable pin allows for the storage device to rotate about at least one of the left bar portion and the right bar portion.

7. The landscaping machine of claim 1, wherein at least one of the first clamp and the second clamp includes a hinge configured to provide rotation of the storage device about the at least one of the first clamp and the second clamp.

8. The landscaping machine of claim 1, wherein the receptacle is an open basket having a flat bottom surface.

9. A storage device comprising:
 a first clamp attachable to a left bar portion of a protective rollover bar of a landscape machine;
 a second clamp attachable to a right bar portion of the protective rollover bar of the landscape machine;
 a support bar extending between the first clamp and the second clamp; and
 a receptacle attached to the support bar, the receptacle extending at least substantially between the first clamp and the second clamp, wherein the receptacle is configured to hold objects during operation of the landscape machine;
 wherein at least one of the first clamp and the second clamp includes a hinge configured to provide hinged rotation of the support bar about the at least one of the first clamp and the second clamp, and wherein the axis of rotation is configured to be at least substantially parallel to at least one of the left bar portion and the right bar portion.

10. The storage device of claim 9, further comprising a removable pin insertable into at least one of the first clamp and the second clamp, wherein removal of the removable pin allows for the support bar to rotate about at least one of the left bar portion and the right bar portion.

11. The storage device of claim 9, wherein the receptacle is an open basket having a flat bottom surface.

12. The storage device of claim 9, wherein the receptacle is an enclosable container.

13. The storage device of claim 9, further comprising a covering system attachable to at least one of the support bar and the receptacle, the covering system including:
 an elongated rotatable member;
 a cover attached to the elongated rotatable member configured to be rolled and unrolled with rotation of the elongated rotatable member;
 wherein the cover includes a front covering portion and a rear covering portion, wherein the front covering portion is configured to cover a front of the landscaping machine in an unrolled state, and wherein the rear covering portion is configured to cover a rear of the landscaping machine in the unrolled state.

14. A storage device kit comprising:
 a first clamp attachable to a left bar portion of a protective rollover bar of a landscape machine;
 a second clamp attachable to a right bar portion of the protective rollover bar of the landscape machine;
 a support bar extendable and attachable between the first clamp and the second clamp; and
 a receptacle attachable to the support bar such that the receptacle is extendable at least substantially between the first clamp and the second clamp, wherein the receptacle is configured to hold objects during operation of the landscape machine;
 wherein at least one of the first clamp and the second clamp includes a hinge configured to provide hinged rotation of the support bar about the at least one of the first clamp and the second clamp, wherein the axis of rotation is configured to be at least substantially parallel to at least one of the left bar portion and the right bar portion.

15. The storage device kit of claim 14, further comprising a removable pin insertable into at least one of the first clamp and the second clamp, wherein removal of the removable pin allows for the storage device to rotate about at least one of the left bar portion and the right bar portion.

16. The storage device kit of claim 14, wherein the receptacle is an open basket having a flat bottom surface.

17. The storage device kit of claim 14, further comprising a covering system attachable to at least one of the support bar and the receptacle, the covering system including:
 an elongated rotatable member;
 a cover attached to the elongated rotatable member configured to be rolled and unrolled with rotation of the elongated rotatable member;
 wherein the cover includes a front covering portion and a rear covering portion, wherein the front covering portion is configured to cover a front of the landscaping machine in an unrolled state, and wherein the rear covering portion is configured to cover a rear of the landscaping machine in the unrolled state.

18. A lawnmower comprising:
 a basket having a flat bottom surface and a first, second, third, and fourth wall extending vertically from the flat bottom surface, wherein the flat bottom surface, and the first, second, third, and fourth walls define an inner storage cavity;
 wherein the basket is permanently attached to the lawnmower a behind an operator seat of the lawnmower; and
 wherein the basket is configured to hold loose objects during operation of the landscaping machine in the storage cavity and wherein the basket is rotatable such that the motor compartment is accessible from above.

19. The lawnmower of claim 18 wherein the basket is located directly behind the operator seat.

20. The lawnmower of claim 18 wherein the basket is located above a motor compartment of the lawnmower.

21. The lawnmower of claim 18, wherein the lawnmower has a width, wherein the basket extends the width.

22. The lawnmower of claim 18, further comprising a protective rollover bar having a left bar portion extending from a left side of an operator seat, a top bar portion extending from the left bar portion above the operator seat, and a right bar portion extending from the top bar portion to a right side of the operator seat, wherein the basket has a length that extends a distance between the left bar portion and right bar portion.

23. The lawnmower of claim 18, wherein a length of the basket is greater than a width of the operator seat.

24. A lawnmower comprising:
- a basket having a flat bottom surface and a first, second, third, and fourth wall extending vertically from the flat bottom surface, wherein the flat bottom surface, and the first, second, third, and fourth walls define an inner storage cavity; and
- a protective rollover bar having a left bar portion extending from a left side of an operator seat, a top bar portion extending from the left bar portion above the operator seat, and a right bar portion extending from the top bar portion to a right side of the operator seat, wherein the basket has a length that extends a distance between the left bar portion and right bar portion,
- wherein the basket is permanently attached to the lawnmower a behind an operator seat of the lawnmower; and
- wherein the basket is configured to hold loose objects during operation of the landscaping machine in the storage cavity.

* * * * *